No. 862,184. PATENTED AUG. 6, 1907.
J. H. MURRAY.
DUMPING WAGON.
APPLICATION FILED MAR. 25, 1907.

3 SHEETS—SHEET 1.

Witnesses

Inventor
J. H. Murray

By Chandler & Chandler
Attorneys

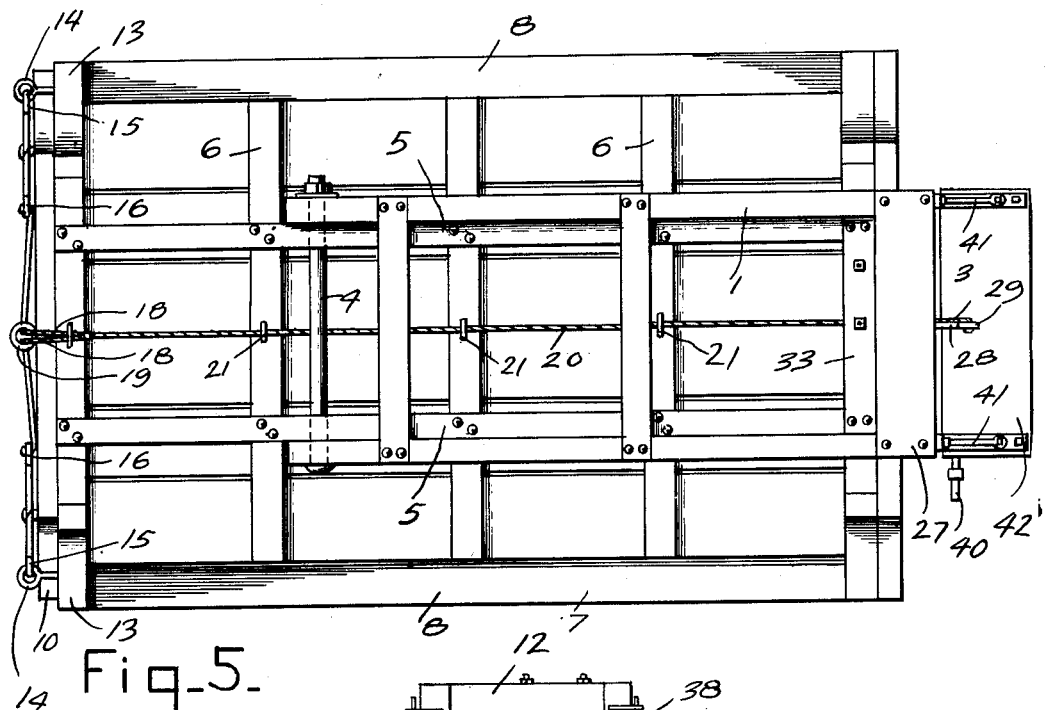
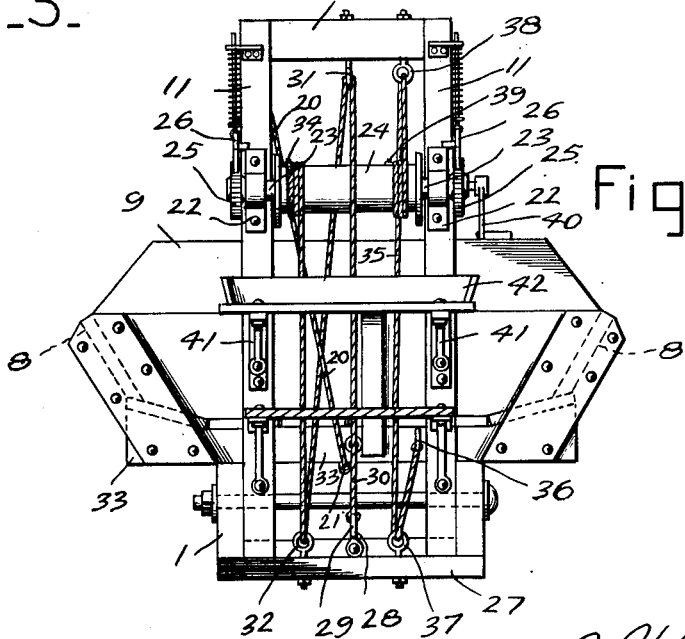

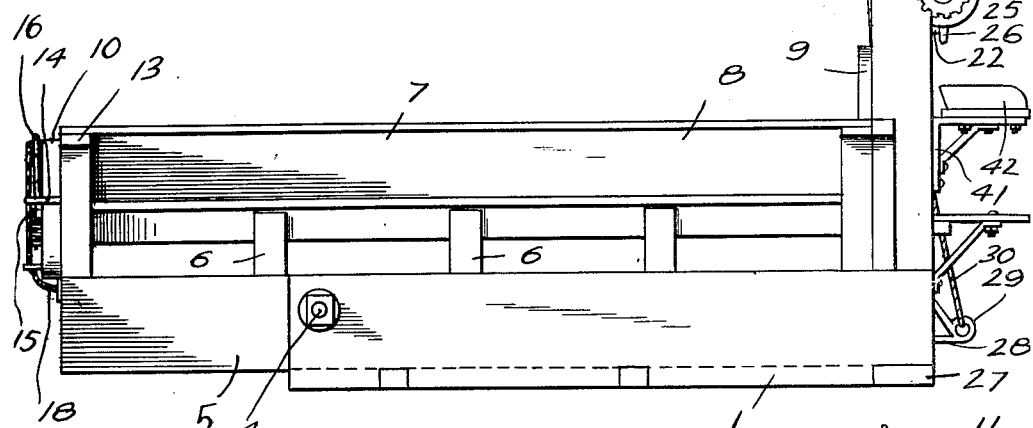
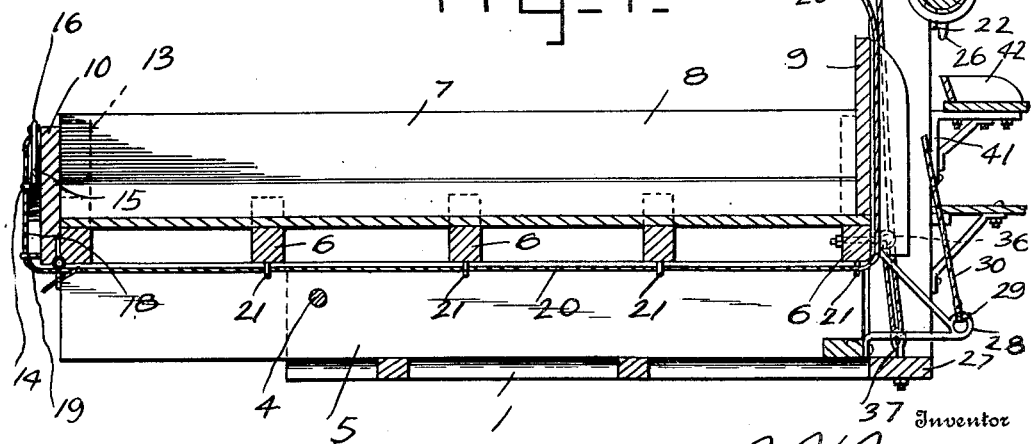

UNITED STATES PATENT OFFICE.

JAMES H. MURRAY, OF LANKIN, NORTH DAKOTA.

DUMPING-WAGON.

No. 862,184.  Specification of Letters Patent.  Patented Aug. 6, 1907.

Application filed March 25, 1907. Serial No. 364,372.

*To all whom it may concern:*

Be it known that I, JAMES H. MURRAY, a citizen of the United States, residing at Lankin, in the county of Walsh, State of North Dakota, have invented certain new and useful Improvements in Dumping-Wagons; and I do hereby declare the following to be a full, clear, and exact description of the invention, such as will enable others skilled in the art to which it appertains to make and use the same.

This invention relates to new and useful improvements in dumping wagons and it has particular reference to a wagon embodying a hopper-shaped body tiltable from the rear end thereof.

In connection with a wagon of the above type, the invention aims as a primary object to provide novel means for raising and lowering the same on its pivot.

The invention aims as a further object to provide a novel construction, combination and arrangement of parts, the details of which will appear in the course of the following description in which reference is had to the accompanying drawings forming a part of this specification, like characters of reference designating similar parts throughout the several views wherein—

Figure 1:
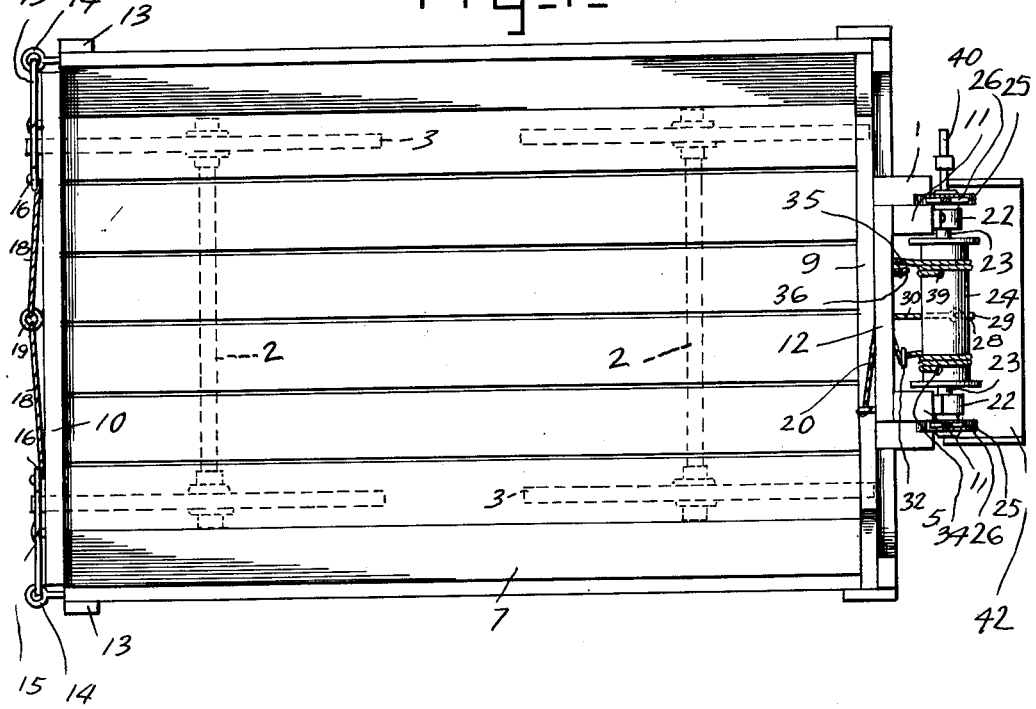
Figure 6:
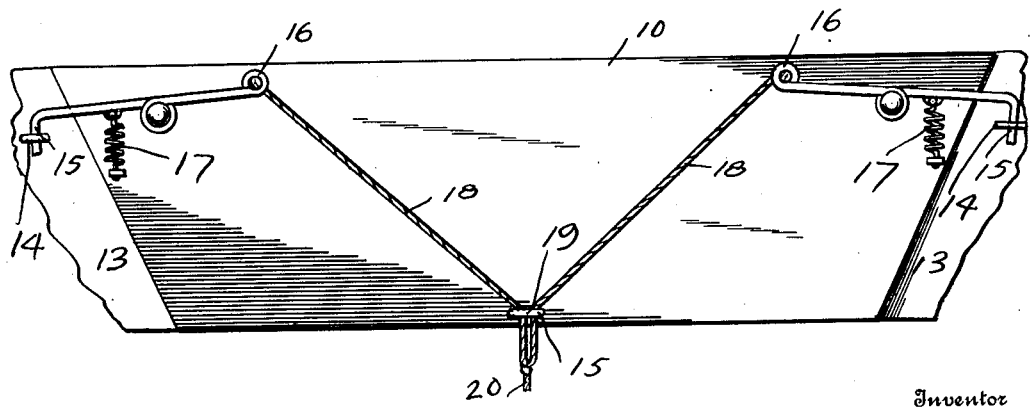

Figure 1 is a top plan view of a wagon constructed in accordance with the present invention. Fig. 2 is a front elevation thereof, the wheels being removed. Fig. 3 is a side elevation of the wagon body and its associated parts. Fig. 4 is a central longitudinal section thereof. Fig. 5 is a bottom plan view thereof, and Fig. 6 is a rear elevation showing the end gate and its controlling mechanism.

The invention in its practical embodiment comprises a frame 1 provided with transverse axles 2 upon which are mounted the traction wheels 3. Between the rear ends of the side bars of the frame 1 is a transverse rod 4 constituting a pivot pin and to this end projected through longitudinal parallel bars 5 arranged in spaced relation between the side bars of said frame and supported from transverse beams 6, the latter constituting the frame of the wagon body 7. As previously intimated said body is of hopper shape and to this end has inclined sides 8. The body 7 has a front end wall 9 and at its rear end is normally closed by an end gate 10. The end gate 10 is hinged at its lower edges to a stationary part or parts of said body 7 and it is designed for downward swinging movement.

The frame 1 supports at the front end of the wagon spaced parallel vertical posts 11 having at their upper ends a transverse connecting member 12. Referring to Fig. 5, a novel controlling means is shown for the end gate. The sides 8 carry at their rear ends angular reinforcing pieces 13 upon each of which is mounted an eye-screw 14. The end gate 10 is provided adjacent said eye-screw 5 with pivoted hooks 15 bent at their outer ends to engage the looped portions of said screw and at their inner ends terminating in loops or eyes 16.

Suitably mounted springs 17 are employed to normally hold the hooks 15 in engagement with the looped portions of the eye-screw 14. Cords or wires 18 have their ends fixed in the loops or eyes 16 and are projected through a suitable guide 19 provided upon the end gate 10. Beyond the guide 19 the cords or wires 18 are connected to a single cord or wire 20 which extends beneath the body 7 and preferably over guide-sheaves 21. The cord or wire 20 is secured at its free end to one of the posts 11 as is shown in Fig. 1.

The posts 11 constitute a support for the mechanical elements employed in raising and lowering the body 7. To this end bearings 22 are mounted in registering relation on the upper portion of each of said posts, said bearings having received therethrough the trunnions 23 of a transverse winding reel 24. The trunnions 23 are projected beyond the bearings 22 and at their ends carry ratchet wheels 25. Double ended pivoted pawls 26 are mounted on each of the posts 11 above said ratchet wheels and are designed to have either of their working ends engaged with the ratchet wheels in order to prevent accidental movement of the body 7 in a determined direction from any position to which said body may be moved. A transverse member 27 spans the front ends of the bars 5 and together with the front end bar 6 supports a forwardly projecting member 28 terminating in a looped end 29, a chain 30 at one end being secured in the looped end 29. Said chain is then trained over guide sheaves 31 and 32 fixed respectively to the member 12 and to the front cross bar 27 of the frame 1. From the sheave 32 the chain 30 is passed over the reel 24 and has its end fixed thereto as at 34. A chain 35 has one end fixed to a projecting staple 36 provided upon the front portion of the body 7. Said chain is then trained over guide sheaves 37 and 38 carried respectively by the bar 6 and the member 12. From the sheave 38 the chain 35 is passed over the reel 24 in an opposite direction from the winding of the chain 30 over said reel, the chain 35 being fixed to said reel as at 39. A crank handle 40 is secured to one of the trunnions 23, said crank handle being projected through the adjacent ratchet wheel 25 and affording a means for raising and lowering the body 7 on its pivot bar 4 as will be hereinafter explained. Brackets 41 are provided upon the forward portion of each of the posts 11 and serve to support a driver's seat 42 from which the driver may operate the reel 24 to raise and lower the body 7 and may likewise operate the cord or wire 20 when it is desired to release the end gate 10.

The manner of use will be readily apparent from the foregoing description. Assuming that it is desired to discharge a load, the driver rotates the reel 24 by means of the crank 40 in the upper direction to wind the chain 30 thereupon. Such action raises the lower end of the chain 30, and consequently raises the body 7 on its pivot bar 4. As the chain 30 is being wound upon the reel 24 to effect the operation above described, the chain 35 is being paid out from said reel. When the body 7 has been tilted to the proper degree, the operator pulls on the cord or wire 20, which action lowers the inner ends of the hooks 15 and raises the outer bent ends thereof from the loops of the eye-screws 14. The pawls 26 effectually prevent backward movement of the body 7 from any position to which it may be set. It will be apparent that when the end gate 10 is released in the manner described, the load within the body 7 will slide along the floor thereof by gravity and will discharge from the rear end of said body. After the discharge of the load from the body 7, the pawls 26 are raised to permit of said body being restored to its normal position upon the frame 1. This action is effected by rotating the crank arm 40 in a reverse direction to that described so as to wind the chain 35 upon the reel 24. Said action by virtue of the connection described pulls the wagon downwardly. As the chain 35 is wound upon the reel 24, the chain 30 is paid out. When the body 7 has been returned to its normal position the pawls 26 are reset to prevent said wagon from yielding on its pivot due to such causes as vibration and rough travel. Owing to the fact that the pawls 26 are double ended they may be so disposed with relation to the ratchet wheels 25 as to prevent the movement of the body 7 in either direction from any selected position.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts without departing from the spirit and scope of the invention as defined in appending claims.

The invention being thus fully described, what is claimed is:

1. In a wagon of the type set forth, a supporting frame comprising parallel side bars and a front end bar, a transverse bar mounted between the rear end of said side bars, a wagon body comprising supporting beams and parallel longitudinal bars depending therefrom in fixed relation, said transverse bars being projected through the rear portions of said longitudinal bars, parallel vertical posts supported upon the front end of said frame, bearings on said posts, a reel having trunnions journaled in said bearings, pawl and ratchet mechanisms for preventing backward movement of said reel from a selected direction of rotation, a member projecting forwardly from said body, a cross-bar connecting the upper ends of said posts, sheaves carried by said cross-bar and by said front end bar of said frame, a chain having one end fixed to said forwardly projecting member, said chain being trained over said sheaves and having its other end fixed to said reel, a crank-arm for rotating said reel and a displaceable end gate.

2. In a wagon of the type set forth, a supporting frame including parallel side bars and a front cross-bar, a wagon body including parallel longitudinal bars disposed between said bars, supporting beams fixed to said longitudinal bars, a floor and sides, a transverse rod projected through the rear ends of said side bars and through said longitudinal bars adjacent their rear ends, and a displaceable end gate provided upon said wagon, parallel vertical posts supported from the front end of said frame, a transverse bar connecting the upper ends of said posts, bearings upon said posts, a reel having its trunnions journaled in said bearings, pawl and ratchet mechanisms for preventing backward movement of said reel with relation to the direction of its rotation, a member projecting forwardly from said body at the front end thereof, a pair of sheaves carried by said front end bar, a chain having one end secured to said forwardly projecting member and from said member trained over one of the sheaves of said transverse bar and over one of the sheaves of said front end bar and having its end fixed to said reel, a second chain having one end fixed to said body and from said fixed end trained over one of the sheaves of said front end bar and over one of the sheaves of said transverse bar and having its other end fixed to said reel, said second chain being wound upon said reel in an opposite direction from the first named chain, and a crank-handle provided at one end of said reel for rotating the same.

In testimony whereof, I affix my signature, in presence of two witnesses.

JAMES H. MURRAY.

Witnesses:
C. R. VERRY,
J. H. VONACHEK.